United States Patent
Giesa et al.

(10) Patent No.: US 12,240,608 B2
(45) Date of Patent: Mar. 4, 2025

(54) INFLATABLE SEPARATING REGION FOR A VEHICLE INTERIOR

(71) Applicant: Airbus Operations GmbH, Hamburg (DE)

(72) Inventors: Hans-Gerhard Giesa, Hamburg (DE); Beke Haenel, Hamburg (DE); Maximilian Grom, Hamburg (DE); Kathrin Thielbeer, Hamburg (DE); Jacqueline Mader, Hamburg (DE); Stefan Wild, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 231 days.

(21) Appl. No.: 17/854,497

(22) Filed: Jun. 30, 2022

(65) Prior Publication Data

US 2023/0002059 A1 Jan. 5, 2023

(30) Foreign Application Priority Data

Jul. 2, 2021 (EP) .................................. 21183563

(51) Int. Cl.
*B64D 11/06* (2006.01)
(52) U.S. Cl.
CPC ................................ *B64D 11/0606* (2014.12)
(58) Field of Classification Search
CPC ........ B64D 11/0606; B64D 2011/0046; E04H 15/20; E04H 2015/201; E04H 2015/202; E04H 2015/203; E04H 2015/206; A61G 10/005; A61G 10/02; E04B 1/169
See application file for complete search history.

(56) References Cited

U.S. PATENT DOCUMENTS

| | | | | |
|---|---|---|---|---|
| 4,440,443 A | * | 4/1984 | Nordskog | B60N 2/882 297/217.4 |
| 4,736,762 A | * | 4/1988 | Wayman | A61G 3/001 128/846 |
| 5,761,852 A | * | 6/1998 | Liu | E04H 15/20 446/478 |
| 8,499,371 B1 | * | 8/2013 | Becker | B63B 29/14 4/479 |
| 10,888,479 B1 | | 1/2021 | Gershon et al. | |

(Continued)

FOREIGN PATENT DOCUMENTS

CN  2547820  4/2003
CN  102 261 128 B  11/2011

(Continued)

OTHER PUBLICATIONS

European Search Report for Application No. 21183563 dated Dec. 8, 2021.

*Primary Examiner* — Christopher D Hutchens
(74) *Attorney, Agent, or Firm* — KDW Firm PLLC

(57) ABSTRACT

An inflatable separating region for a vehicle interior, in particular for a passenger cabin of an aircraft, includes a supporting structure with interconnected inflatable tubes made of a flexible material and arranged, in an inflated state, to form a self-supporting frame structure for the separating region; and a covering with flexible wall membranes which connect the inflatable tubes to one another in a planar manner to separate off the separating region in the inflated state from the vehicle interior.

18 Claims, 3 Drawing Sheets

(56) References Cited

U.S. PATENT DOCUMENTS

| | | | | |
|---|---|---|---|---|
| 2002/0083653 A1* | 7/2002 | Hilbert | ............ | E04H 15/20 |
| | | | | 52/2.17 |
| 2008/0078432 A1* | 4/2008 | Schalla | ............ | E04H 15/20 |
| | | | | 135/87 |
| 2011/0203189 A1* | 8/2011 | Moran | ............ | E04H 15/20 |
| | | | | 52/79.5 |
| 2016/0332717 A1* | 11/2016 | Guering | ............ | B64C 1/1407 |
| 2017/0253312 A1* | 9/2017 | Burleson | ............ | B63C 11/44 |
| 2021/0307985 A1* | 10/2021 | Staab | ............ | A61G 10/005 |

FOREIGN PATENT DOCUMENTS

| | | | |
|---|---|---|---|
| EP | 2139764 A1 | | 1/2010 |
| EP | 2554477 A2 | | 2/2013 |
| EP | 3 272 643 A1 | | 1/2018 |
| FR | 3040022 A1 | * | 2/2017 |
| KR | 102230159 B1 | * | 3/2021 |
| WO | WO 2008/008910 A2 | | 1/2008 |

* cited by examiner

INFLATABLE SEPARATING REGION FOR A VEHICLE INTERIOR

CROSS-REFERENCE TO RELATED APPLICATION

This application claims priority to European Patent Application No. 21183563.2 filed Jul. 2, 2021, the entire disclosure of which is incorporated by reference herein.

TECHNICAL FIELD

The disclosure herein relates to an inflatable separating region for a vehicle interior, in particular for a passenger cabin of an aircraft.

BACKGROUND

In aircraft design and aircraft manufacturing, there are continuously endeavours to improve the efficiency and cost of production, the outlay on installation and the installation time and also the durability and to reduce the overall weight while keeping the component performance the same or improving it, with a particular focus always being placed on passenger comfort and safety. In recent years, there have been occasional attempts in the aviation industry to use inflatable structures as weight-saving solutions for the interior region and exterior region of aircraft. Inflatable components are already widespread in other spheres of technology, for example in the leisure industry and in the camping sphere where they comprise, inter alia, inflatable tents, sitting and/or reclining devices, floatable devices and so forth. However, in order to be able to use such structures in the sphere of aviation, additional challenges have to be overcome. Among other things, relatively large differences in pressure have to be resisted. Preferred materials are durable and long-lasting and meet all the safety requirements, for example in respect of inflammability. In addition, it would be desirable to design the geometry of the inflatable devices so as to be as stable as possible in the inflated state.

As an example of such an inflatable device, the document EP 3272643 A1 describes an inflatable partition for an aircraft, which partition can be installed in a passenger cabin in order to divide the space into different sections or regions.

As a further example, the documents EP 2139764 B1 and EP 2554477 B1 describe a bunk with plate-like air chambers which form a self-supporting wall structure with side walls and a ceiling, wherein the air chambers are surrounded by flexible planar material and, in their interior, have flexible webs for stabilizing an external shape. The bunk has a base shell with upright wall attachments onto which the wall structure can subsequently be placed.

Furthermore, the U.S. Pat. No. 10,888,479 B1 describes a biosafety cabin for protecting the occupants of a vehicle against pathogens. The biosafety cabin comprises a rigid or flexible protective covering element made from a durable and optionally fireproof material, for example glass, Plexiglas or plastic, which forms a three-dimensional structure which is installed in the interior of the vehicle and which isolates one or more occupants of the biosafety cabin from other occupants of the vehicle. A multiplicity of connecting elements are attached to the protective covering element and are used to fasten the protective covering element in the interior of the vehicle. Furthermore, the protective covering element comprises air circulation openings for connecting to an air filter device, and an entry/exit element for entering or leaving the biosafety cabin through the protective covering element, wherein the entry/exit element can have a zip fastener, a touch and close fastener or another suitable closure system.

SUMMARY

Against this background, the disclosure herein is based on an object of finding improved weight-saving solutions for separating off delimited cabin regions of aircrafts, which solutions can be installed and removed as simply and as rapidly as possible, even during operation.

According to the disclosure herein, this object is achieved by an inflatable separating region and by an aircraft disclosed herein.

Accordingly, an inflatable separating region for a vehicle interior, in particular for a passenger cabin of an aircraft, comprises a supporting structure which has a plurality of interconnected inflatable tubes made of a flexible material and being arranged and designed so as, in an inflated state, to form a self-supporting frame structure for the separating region; and a covering which comprises a plurality of flexible wall membranes which connect the inflatable tubes to one another in a planar manner and are designed to separate off the separating region in the inflated state from the vehicle interior.

Furthermore, an aircraft comprises an inflatable separating region according to the disclosure herein.

A concept on which the disclosure herein is based involves providing a region for a vehicle interior that can be installed and removed rapidly and simply by inflatable flexible tubes and supporting structures being combined with thin flexible wall membranes which separate an interior of the separating region from the vehicle interior. The tubes serve here to a certain extent as a supporting or carrying framework/skeleton comparable to the poles of a tent and at the same time define an external contour of the region to be separated off. The wall membranes ensure that the interior created in this manner is actually separated off from the vehicle interior, in particular in the horizontal direction.

For the installation, the tubes can be provided with one or more valves via which the system can be pumped up at a suitable position with an air pump, a bellows, a gas cartridge and/or a compressor. In principle, use can also be made for this purpose of systems which are already present on board the vehicle and which can quickly provide compressed air, for example an air preparation system and/or a compressor system of an aircraft. As soon as the tubes are sufficiently inflated, they spread out the wall membranes which are located in between and which then form the walls of the separating region. Special further tools or aids are not absolutely required for the installation. The specific erection position can also be quickly selectable in a particularly flexible manner here depending on the internal configuration of the vehicle interior.

The separating cabin or separating cell created in such a manner can be used within the vehicle interior for a wide variety of purposes, with the special construction permitting the system to be installed and/or removed very quickly even during operation of the vehicle. For as long as the separating region is not being used, it can be stowed folded up in a space-saving manner. Use is made here of the fact that the system can be constructed in a particularly weight-saving manner by suitable thin materials being used for the flexible material of the tubes and wall membranes and at the same time being able to comply with appropriate safety requirements in respect of inflammability, durability, tearing strength, environmental compatibility, etc. The system can also be used repeatedly depending on requirements.

For example, the separating region can be constructed on board an aircraft which is already in the air, in order to isolate one or more passengers from the remaining passengers, for example in the event of a medical emergency, a highly contagious infection or the like. However, it goes without saying that an inflatable separating region within the meaning of the disclosure herein can be used not only as a protective measure for medical or infectious applications. Furthermore, the disclosure herein can be used to quickly, but also permanently, create rest areas in a passenger cabin, either for passengers or for the crew. Depending on the specific application, the wall membranes of the covering can be transparent or more or less opaque.

Advantageous refinements and developments emerge from the description with reference to the figures.

According to one development, the separating region in the inflated state is open upwards and/or downwards.

For example, the separating region can be surrounded only on all horizontal sides by the wall membranes and can sit on a floor of the vehicle interior. A remaining opening upwards can be used, for example, for supplying air. Provision may also be made for the separating region to end upwards and downwards in a precisely fitting manner with a floor and a ceiling of the vehicle interior.

In principle, it is also conceivable for the separating region not to be closed on all horizontal sides, but rather merely on these sides to have wall membranes which are oriented into the vehicle interior and are not already in any case bounded by inner walls of the vehicle interior. In other words, provision may be made in certain applications to use one or more inner walls of the vehicle cabin as outer walls of the separating region. In this case, it could be possible, for example, for an outer wall of the vehicle not to be covered by the wall membranes and the latter could be provided merely on the aisle side and forwards and rearwards.

According to one development, the supporting structure and the covering can be designed to close off the separating region upwards and/or downwards at least in some regions in a precisely fitting manner with the vehicle interior.

The separating region can therefore sit all the way around on the floor of the vehicle interior and can butt against a ceiling without an (at least edge-side) opening remaining towards the vehicle interior. In this case, air can be supplied to the separating region, for example, via air slots or the like which are arranged at the top and bottom (in principle, however, also laterally) and are embedded in the wall membranes. The air can be introduced via air outlets in the vehicle interior ceiling located above the separating region and can be let out again via corresponding air vents in the floor of the vehicle interior. Alternatively, provision may be made for the separating region not to be completely closed off upwards and/or downwards through the vehicle interior, but rather for ventilation slots to remain via which the separating region remains connected air-permeably to the vehicle interior. Furthermore, as an alternative or in addition, ventilation elements can be integrated in the supporting structure and/or the covering of the separating region.

According to one development, at least three of the tubes can be designed as substantially vertically running struts. Further tubes can serve as transverse connections of the struts.

For example, the separating region can have a rectangular basic outline, with four substantially vertically running tubes forming outer edges of the separating region and the tubes being held together at an upper end by four transversely running tubes. However, it goes without saying that more complex outer geometries and/or tube arrangements are also possible.

According to one development, three vertically running tubes as outer edges of the separating region can be connected at an upper end at three corners of a rectangle formed by four transversely running tubes.

In this development, use is made of the finding that, in principle, three outer struts can provide sufficient stability or sturdiness for a separating region if they are held together at an upper end by corresponding transverse connections. The fourth edge of the structure that is open or kept free as a result can be used, for example, as an exit or entry region, and therefore more movement clearance can remain than if a fourth vertically running strut were provided. This can be particularly advantageous, for example in the event of emergencies, so that it is possible to leave the separating region as simply and easily as possible.

The sturdiness of this arrangement which is reminiscent of a tripod can be further improved by, for example, a fastening element being provided at an upper end, in particular in the region of the "open edge", at which there is no vertically running tube, and is fixed there, for example, to a wall and/or ceiling of the vehicle interior.

According to one development, at least a portion of the tubes can be kinked and/or curved for adaptation to an inner contour of the vehicle interior.

The outer contour of the separating region that is defined by the tubes can therefore fit more or less precisely against an inner contour of the vehicle interior. Thus, on the one hand, the available space can be optimally used. On the other hand, the separating region can thus be supported and stabilized in a particularly advantageous manner by inner walls or other structures of the vehicle interior such that the separating region remains as far as possible in a desired position even in the event of jerky movements of the vehicle.

According to one development, the tubes can form a jointly inflatable volume.

The supporting structure of the separating region can therefore be set under pressure, optionally via an individual valve, e.g. comparably to an air mattress in which a plurality of interconnected air chambers can be filled with air via an individual valve.

According to one development, the wall membranes can be transparent and/or translucent at least in regions.

For example, a transparent wall membrane in a medical application can enable a patient or passenger to be able to be observed medically from outside the separating region. On the other hand, in the event of use of the separating region as a rest region or bunk, it may be totally undesirable for the separating region to be seen into. In this case, opaque wall membranes would therefore be chosen.

A further advantage afforded here is that the separating region if sufficiently transparent can remain closed during landing. By contrast, the opaque curtains typically used in aircraft always have to be opened. The present system can be designed, by contrast, to be seen into because of the use of transparent material. The air-filled elements to not constitute a risk of injury. Added to this is a simple construction and optionally rapid opening possibilities, for example by a zip fastener which is easy to open.

According to one development, the wall membranes can each have a flame-retarding thermoplastic film.

For example, use can be made of extruded films made from different polymer compositions that are suitable for thermoplastic processing and that provide corresponding mechanical properties (e.g. strength, abrasion resistance, flexibility), chemical properties (e.g. fire-retarding or fireproof, chemical resistance) and/or biological properties (e.g. environmental compatibility, suitability for medical applications). In one specific example, a polyurethane film made from polyester or polyether can satisfy such properties.

According to one development, the wall membranes and the tubes can be manufactured from the same flexible material.

The separating region can therefore be manufactured in particular completely from one certain suitable material to a certain extent "en bloc", with a uniform appearance being provided in which the supporting structure and the covering have the same advantageous properties. Furthermore, the wall membranes can be welded, adhesively bonded and/or sewn to the tubes. For example, in a medical application, the tubes and the wall membranes can be composed of the same transparent or semi-transparent material.

According to one development, at least one of the wall membranes can be designed with a reclosable passage opening to allow people to enter and leave the separating region.

The passage can be used, for example, by medical personnel in order to examine a patient. Such a passage can also be provided as an emergency exit.

According to one development, the passage opening can be reclosable via a zip fastener.

Zip fasteners, in particular certain safety zip fasteners, as optionally reusable safety opening systems can ensure a rapid and controlled opening of emergency exit openings. To protect against heat and flames, for example, zip fastener elements made from flame-retarding polyamide can be combined with a strip of aramid fibres.

However, it goes without saying that, depending on use, use may also in principle be made of other closing systems, for example a touch and close fastener, press studs, magnets, etc.

According to one development, the separating device can then furthermore have a pressure control device which is designed to control an internal pressure of the tubes.

For example, the pressure control device can comprise a display which is coupled to a pressure sensor and which displays a current internal pressure of the tubes such that it can be checked at any time whether the internal pressure lies within a suitable pressure range or has a certain value. Furthermore, the pressure control device can have a valve via which the internal pressure of the tubes can be adjusted or which predefines a certain desired internal pressure.

Accordingly, the pressure control device can be used, inter alia, to suitably set the pressure once during the erection of the separating device. In principle, it can then be readjusted during further operation if a relevant change in pressure, for example a drop in pressure, in the tubes is displayed.

If, for example, the separating device of the disclosure herein is constructed in the air during the flight of an aircraft, it can be ensured by the crew that the internal pressure of the tubes is sufficiently dimensioned in order to ensure sturdiness of the separating device even in relation to the changes in pressure in the vehicle interior that may be anticipated during the further course of the operation. For example, the separating device may be required to remain in place until landing. For this purpose, the internal pressure of the tubes can be set by the crew (once) in a specific manner with a positive pressure directly during the installation or construction of the separating device such that the separating device remains stably in place even after landing and the associated increase in pressure in the cabin. If necessary, however, the current pressure can be controlled and optionally adjusted at any time during operation with the aid of the pressure control device.

In principle, the pressure control device can furthermore also be designed for (optionally automatically) regulating the internal pressure of the tubes. However, in simple refinements of the disclosure herein, the pressure can also be readjusted, for example, manually by the crew, and the pressure control device can serve merely to display the current internal pressure.

According to one development, the supporting structure and the covering can be designed so as, in the inflated state, to surround at least one seat of the vehicle interior.

In this case, a seat of a row of seats in a vehicle together with the passenger sitting thereon can therefore be isolated from the vehicle interior. For example, a window seat in a row of two or three seats in an aircraft can be separated off. Similarly, a plurality or all of the seats of a row of seats can be separated from the vehicle interior and from the rows of seats located in front of or behind it.

According to one development, at least one of the wall membranes can be designed with feedthroughs for elements of adjacent seat structures of the vehicle interior.

The individual seats in a row of seats of an aircraft are frequently connected fixedly to one another, for example at a seat frame, arm rest and/or seat surface. So that the separating region can also be installed retrospectively around one or more passenger seats, one or more feedthroughs can therefore be provided in the wall membranes. For example, the wall membranes can also be suitably slotted such that each wall membrane can be placed around the corresponding structure of the seat. Suitable closure systems, such as touch and close fasteners, press studs or zip fasteners, can then be used to close remaining gaps or chinks between the wall membrane or wall membranes and the seat structure.

According to one development, the separating region can furthermore have at least one fastening element for fixing the position of the separating region in the vehicle interior.

In particular, the fastening element can be a suction cup and/or a hook or a similar suitable aid.

Even though the supporting structure can in principle sufficiently stabilize or support the separating region, it may be additionally of advantage if the separating region can furthermore be fixed, for example, to a wall and/or a ceiling of the vehicle interior via one or more elements. This can afford advantages, for example, from a safety aspect, e.g. in the event of unpredicted jerky movements of the vehicle, so that the positioning and orientation of the separating region is maintained at all times.

In this connection, suction cups are an example and advantageous possibility which permits fixing to virtually any surfaces and which can be removed again without leaving traces behind. It goes without saying that, alternatively or additionally, use can also be made of other fastening elements, e.g. hooks, strips, loops, adhesive holders, etc. For example, the system could be fastened to a luggage compartment via a hook-type handrail.

The above refinements and developments can, if expedient, be combined with one another as desired. Further possible refinements, developments and implementations of the disclosure herein also comprise combinations not mentioned explicitly of features of the disclosure herein described previously or below with respect to the example embodiments. In particular, a person skilled in the art will also add individual aspects as improvements or additions to the respective basic form of the disclosure herein.

BRIEF DESCRIPTION OF THE DRAWINGS

The disclosure herein will be explained in more detail below with reference to the example embodiments indicated in the schematic figures, in which.

DETAILED DESCRIPTION

Figure 1:
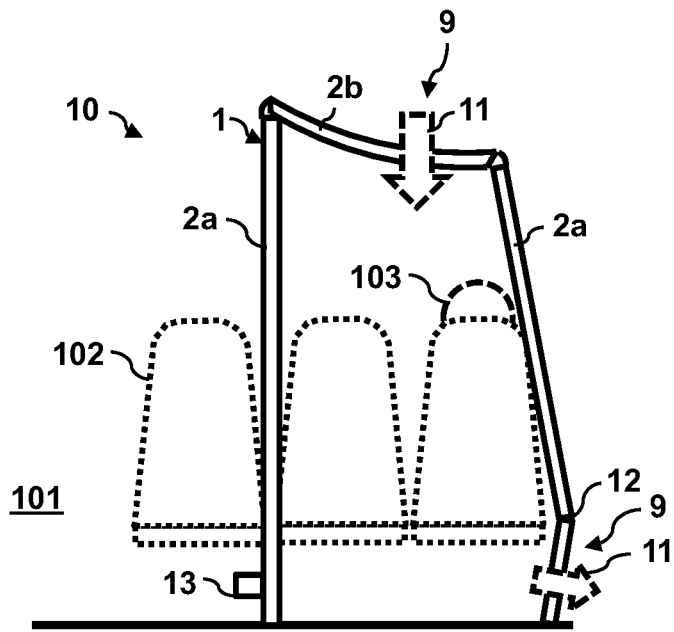
FIG. 1 shows a schematic sectional view of an inflatable separating region according to an embodiment of the disclosure herein.

The attached figures are intended to impart further understanding of the embodiments of the disclosure herein. They illustrate embodiments and serve in conjunction with the description to explain principles and concepts of the disclosure herein. Other embodiments and many of the advantages mentioned are apparent with respect to the drawings. The elements of the drawings are not necessarily shown true to scale with respect to one another.

In the figures of the drawing, identical, functionally identical and identically acting elements, features and components are each provided with the same reference signs—unless stated otherwise.

Figure 2:
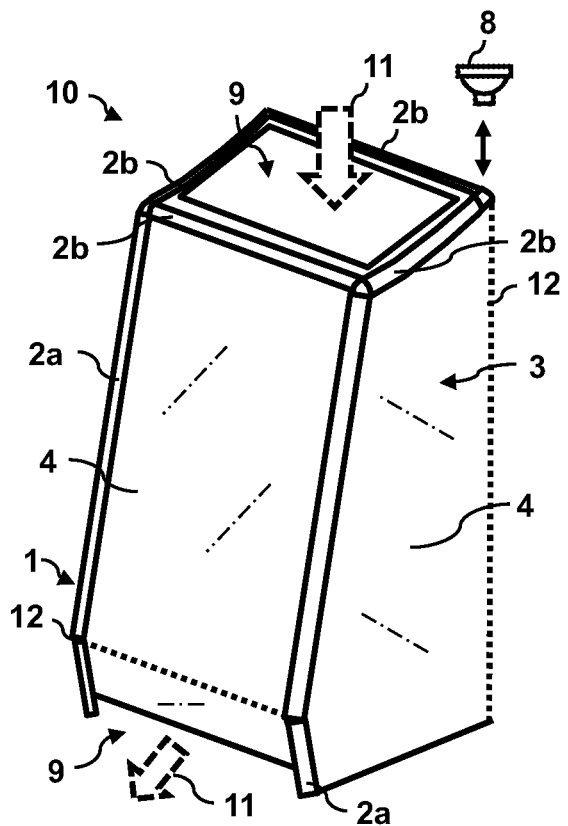
FIG. 2 shows a schematic perspective view of the separating region from FIG. 1 obliquely from the outside.
Figure 3:
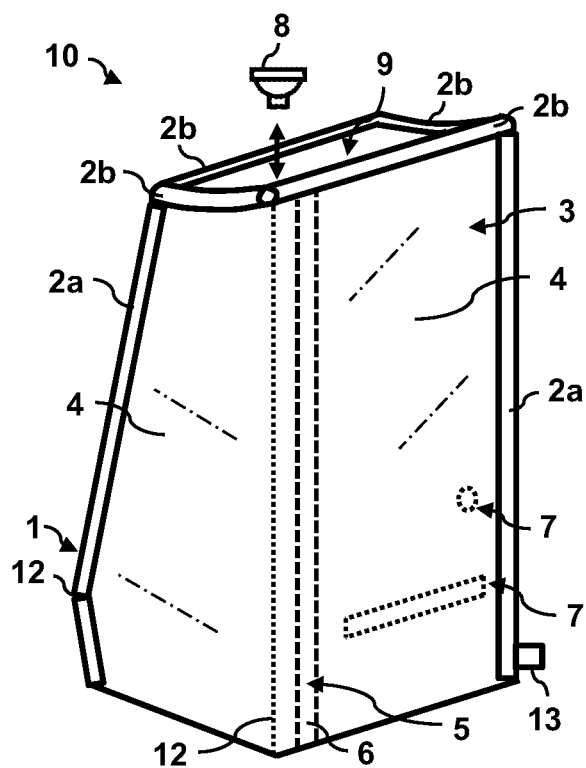
FIG. 3 shows a schematic perspective view of the separating region from FIG. 1 obliquely from the inside.
Figure 4:
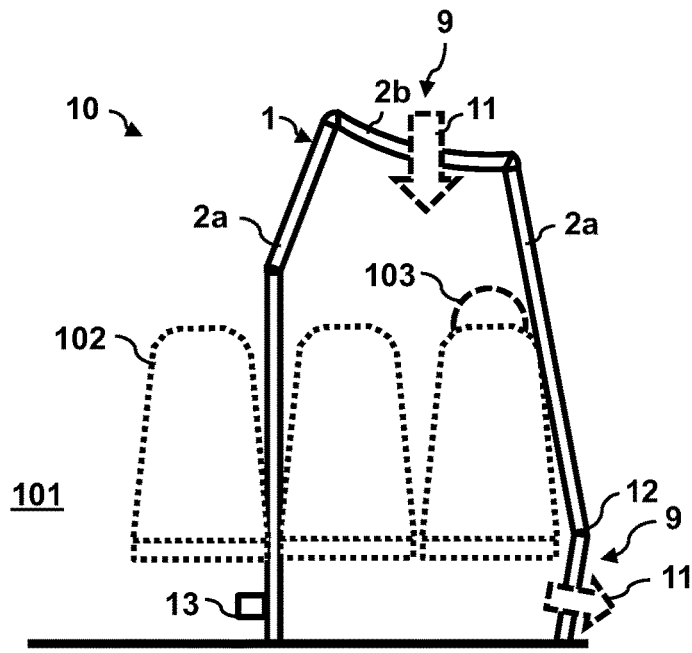
FIG. 4 shows a schematic sectional view of an inflatable separating region according to a further embodiment of the disclosure herein.
Figure 5:
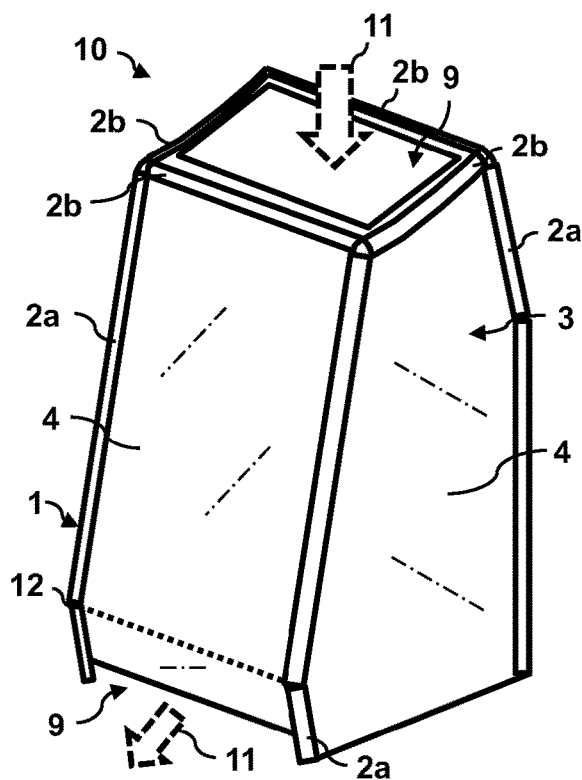
FIG. 5 shows a schematic perspective view of the separating region from FIG. 4 obliquely from the outside.
Figure 6:
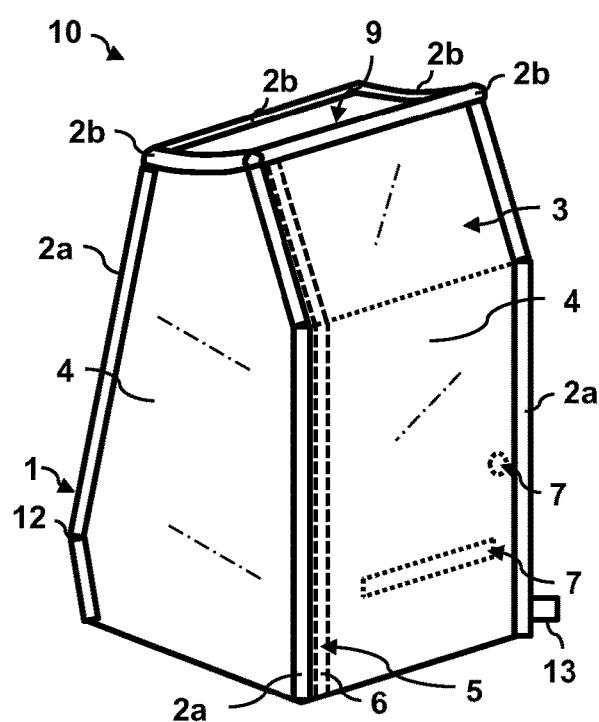
FIG. 6 shows a schematic perspective view of the separating region from FIG. 4 obliquely from the inside.

FIG. 1 shows a schematic sectional view of an inflatable separating region 10 according to an embodiment of the disclosure herein, which serves to separate off a limited region in a vehicle interior 101. FIGS. 2 and 3 show schematic perspective views of the separating region from FIG. 1 obliquely from the outside and obliquely from the inside, respectively. The inflatable separating region 10 can be used, for example, in a passenger cabin of an aircraft 100, as can be seen by way of example in FIG. 7. In the embodiment shown, the separating region 10 serves as an isolating cabin or isolating cell for enclosing symptomatic cases, e.g. for isolating a person for the remaining flight time in order to protect the further passengers. For example, the separating region 10 can be used if there is the suspicion that a passenger has a highly contagious illness or the latter has already been verified.

Various approaches are used in practice to minimize the risk of spreading pathogens by people displaying the symptoms of a contagious disease. A number of customary approaches for preventing the propagation of pathogens comprise ensuring spatial distances between people, reducing contact possibilities and using personal protective equipment, for example respiratory masks. For example, IATA, like other organizations, recommends, if a contagious disease is suspected during a flight, maintaining a distance of two metres between ill passengers and other passengers. These recommendations mean that a considerable portion of seats can no longer be used.

An aim of the separating region 10 described below is to provide a physical barrier for one or more possibly infectious people, which barrier can be constructed rapidly and simply even during the flight and does not involve any weight disadvantages. The separating region 10 here is in particular not limited to a fixedly predefined position in the vehicle interior 101, but rather can basically be erected at different locations. The separating region 10 can be used multiple times and, for this purpose, should be disinfected where necessary.

Figure 7:
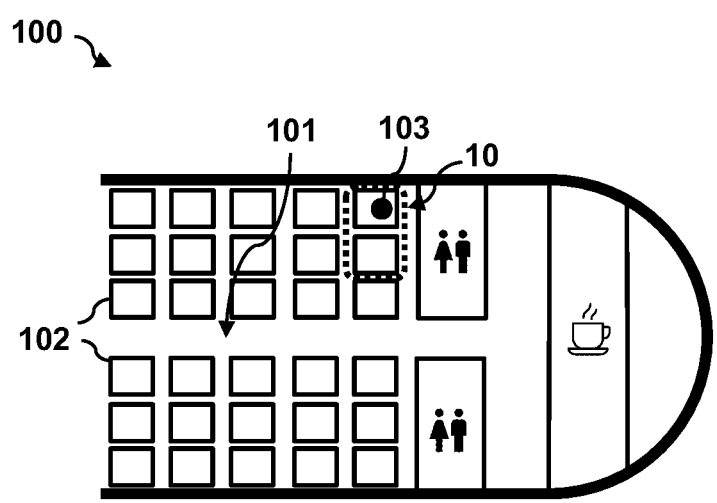
FIG. 7 shows a schematic top view of a passenger cabin of an aircraft with a separating region according to FIG. 1 or 4.

In the example embodiment of FIG. 7, the separating region 10 separates two seats 102 of the last row of seats on the right aisle side from the sanitary facilities. A potentially infectious passenger 103 is sitting on the window seat within the separating region 10. FIG. 1 shows the situation in a sectional view from the rear with respect to a longitudinal extent of the aircraft 100.

The separating region 10 comprises a supporting structure 1 which has a plurality of interconnected inflatable tubes 2a, 2b made from a flexible material which are arranged and designed so as, in an inflated state, to form a self-supporting frame structure for the separating region 10. As can be gathered from FIGS. 1 to 3, in this embodiment, specifically three substantially vertically running tubes 2a are provided which stand on a floor of the aircraft 100 and form a type of tripod. They are held together at an upper end by a ring or square made from four transversely running tubes 2b.

The tubes 2a, 2b form a common volume which can be filled with air via a suitably attached valve by a hand pump, a small compressor and/or a compressed air source installed on board the aircraft 100. The separating device 10 furthermore comprises a pressure control device 13 which can be used for controlling and/or adjusting an internal pressure of the tubes 2a, 2b. For this purpose, the pressure control device 13 can comprise, for example, a pressure sensor and a pressure display. Furthermore, the abovementioned valve can be integrated in the pressure control device 13.

By the pressurization, the tubes 2a, 2b are stiffened and thereby form a type of self-supporting framework or skeleton which predefines an outer contour of the separating region 10 and imparts stability and sturdiness to the latter. The internal pressure of the tubes 2a, 2b can be set once here, as the separating device 10 is being erected, such that the separating device 10 continues to remain stable in place even in the event of changes in pressure within the vehicle interior 101, e.g. even after the aircraft 100 has landed.

The vertical tubes 2a are, for example, partially provided with kinks 12 while the transversely running tubes 2b are slightly curved in order to follow an inner contour of the vehicle interior 101 as far as possible. In the specific example embodiment of FIGS. 1 to 3, the vertical tube 2a situated towards the aisle is rectilinear, whereas the two opposite tubes 2a lie against an outer wall of the aircraft 101 and, for this purpose, are kinked and accordingly run slightly obliquely along the outer wall. The transversely running tubes 2b are adapted here to the lower contour of a stowage or luggage compartment (not illustrated) situated above them. The supporting structure 10 thereby ends at the top and bottom in principle in a precisely fitting manner with the inner contour of the vehicle interior 101, with the vertical tubes 2a standing on the floor and the transversely running tubes 2b lying against the ceiling or the stowage compartment.

The separating region 10 furthermore comprises a covering 3 which comprises a plurality of flexible wall membranes 4 which connect the inflatable tubes 2a, 2b to one another in a planar manner and are designed to separate off the separating region 10 in the inflated state from the vehicle interior 101. For example, the wall membranes 4 can be manufactured here from a transparent or semi-transparent, flame-retarding thermoplastic film. The tubes 2a, 2b of the supporting structure 1 can be manufactured from the same material and, for example, welded to the wall membranes 4.

Overall, a separated-off cell is therefore formed, the supporting structure of which is formed by the tubes 2a, 2b and the outer walls of which are formed by the wall membranes 4. The separating region 10 is kept open upwards and downwards, with an air passage 9 located at the top permitting fresh air 11 to enter from the ventilation system of the aircraft 100. On the window side of the vehicle interior 101 (on the right in FIG. 1 and on the left in FIG. 2), a slot-shaped air passage 9 is furthermore provided in the vicinity of the floor, through which fresh air 11 can flow out again from the separating region 10 (in this region, the covering 3 therefore does not end in a precisely fitting manner with the floor).

The air supply can be regulated here in such a manner that a small negative pressure is effectively set within the separating region 10 by the flow conditions such that, for example, viruses or other pathogens cannot escape from the separating region 10, even if the latter is not closed off air-tightly from the vehicle interior 101.

Owing to the upwardly open arrangement, a passenger 103 in the separating region 10 continues to have access to a passenger service unit (PSU), emergency oxygen masks, etc.

In the embodiment of FIGS. 1 to 3, a reclosable passage opening 5 for entering and leaving the separating region 10 is furthermore incorporated in one of the wall membranes 4, which passage opening can be opened and closed via a zip fastener 6. In this way, in principle, an emergency exit from the separating region 10 could also be realized, for example by use of a safety zip fastener system, such as, for example, the Quickburst system from the YKK Fastening Products Group, or a corresponding system.

So that the covering 3 can completely surround the two seats 102, furthermore a plurality of feedthroughs 7 for elements of the adjacent third seat 102 are formed in the aisle-side wall membrane 4, for example for the passage of an arm rest and/or a seat frame. For this purpose, the wall membrane 4 can be slotted (not illustrated) from one or more sides towards the feedthroughs 7 so that the wall membrane 4 can be guided around the corresponding elements and optionally fastened in this arrangement around them (e.g. via a touch and close fastener, press studs, etc.).

As has already been mentioned, the separating region 10 of FIGS. 1 to 3 is supported only by three substantially vertically running tubes 2a. In order to further stabilize this arrangement and in particular to ensure that it is fixed in position in the vehicle interior 101, the separating region 10 can furthermore comprise one or more fastening elements 8. For example, it can be provided that the transversely running tubes 2b are fixed via such fastening elements 8 to a ceiling, a stowage compartment and/or a wall of the vehicle interior 101.

For this purpose, FIGS. 2 and 3 representatively depict by way of example an individual fastening element 8 which is designed as a suction cup and is attached to the supporting structure 1 of the separating region 10 in a region under which a fourth vertical support would be arranged in terms of symmetry. In other words, the fastening element 8 therefore compensates for the missing vertically running tube 2a on the right in FIG. 2 or at the front centre in FIG. 3. Fixing via one or more suction cups (e.g. made from rubber or natural rubber) affords the particular advantage that the separating region 10 can be retrofitted and can be installed virtually in any desired cabins without fastening means and/or particular fastening points having to be present in the cabin.

As an alternative to the embodiment from FIGS. 1 to 3, FIGS. 4 to 6 show a variant of the disclosure herein which has four substantially vertically running tubes 2a. In this example, the aisle-side tubes 2a are also kinked, for example in order to comply with a different cabin shape or different geometrical requirements.

It is clear here to a person skilled in the art that completely different geometrical conditions can be complied with by appropriate kinking and bending of the tubes 2a, 2b. Similarly, the shown number and orientation of the tubes 2a, 2b should be understood as being purely by way of example.

As a result, an extremely lightweight (e.g. a few kilograms) and nevertheless particularly practical solution is created for an isolated region in a vehicle cabin, which solution can be folded up and can also be stowed in a greatly space-saving manner in this form (e.g. in a carrying pocket). All that is needed for the installation is a device for filling with air (e.g. an air pump) and optionally one or more fastening elements, for example suction cups or hooks. Even in a safety critical aspect, the system affords numerous advantages because of the low weight, the flexibility, the rapid accessibility in the event of an emergency, etc. In addition, unlike in conventional approaches, seats in the immediate vicinity of the separating region 10 can also be occupied without there being a relevant safety risk and/or infection risk to the passengers sitting there. The seat occupancy in general can therefore be improved.

In the preceding detailed description, various features for improving the stringency of the illustration have been combined in one or more examples. However, it should be clear here that the above description is merely illustrative, and does not have a restrictive nature in any way. It serves to cover all the alternatives, modifications and equivalents of the various features and example embodiments. Many other examples will be clear immediately and directly to a person skilled in the art on the basis of his/her specialist knowledge in view of the above description.

The example embodiments have been selected and described in order to be able to present the principles underlying the disclosure herein and their application possibilities in practice as well as possible. As a result, specialist personnel can modify and use the disclosure herein and its various example embodiments in an optimum way with respect to the intended purpose of use.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Supporting structure
2a, 2b Tube

3 Covering
4 Wall membrane
5 Passage opening
6 Zip fastener
7 Feedthrough
8 Fastening element
9 Air passage
10 Inflatable separating region
11 Air circulation
12 Kink
13 Pressure control device
100 Aircraft
101 Vehicle interior
102 Seat
103 Passenger

The invention claimed is:

1. An inflatable separating region for a vehicle interior or a passenger cabin of an aircraft, comprising:
   a supporting structure comprising a plurality of interconnected inflatable tubes made of a flexible material and arranged, in an inflated state, to form a self-supporting frame structure for the separating region; and
   a covering comprising a plurality of flexible wall membranes which connect the inflatable tubes to one another in a planar manner and are configured to separate off the separating region in the inflated state from the vehicle interior or passenger cabin of an aircraft;
   wherein the separating region in the inflated state is open upwards, wherein the supporting structure and the covering are configured to close off the separating region upwards at least in regions in a precisely fitting manner with a ceiling of the vehicle interior or passenger cabin of the aircraft; and
   wherein the separating region in the inflated state is open downwards, wherein the supporting structure and the covering are configured to close off the separating region downwards at least in regions in a precisely fitting manner with a floor of the vehicle interior or passenger cabin of an aircraft.

2. The inflatable separating region according to claim 1, wherein at least three of the plurality of tubes are substantially vertically running struts, with further ones of the plurality of tubes serving as transverse connections of the struts.

3. The inflatable separating region according to claim 2, wherein three of the substantially vertically running struts are configured as outer edges of the separating region that are connected at an upper end at three corners of a rectangle formed by four transversely running tubes of the plurality of tubes.

4. The inflatable separating region according to claim 1, wherein at least a portion of the tubes is kinked and/or curved for adaptation to an inner contour of the vehicle interior.

5. The inflatable separating region according to claim 1, wherein the tubes form a jointly inflatable volume.

6. The inflatable separating region according to claim 1, wherein the wall membranes are transparent and/or translucent at least in regions.

7. The inflatable separating region according to claim 1, wherein the wall membranes each have a flame-retarding thermoplastic film.

8. The inflatable separating region according to claim 1, wherein the wall membranes and the tubes are manufactured from a same flexible material.

9. The inflatable separating region according to claim 1, wherein at least one of the wall membranes comprises a reclosable passage opening to allow people to enter and leave the separating region, wherein the passage opening is reclosable by a zip fastener.

10. The inflatable separating region according to claim 1, comprising a pressure control device to control an internal pressure of the tubes.

11. The inflatable separating region according to claim 1, wherein the supporting structure and the covering are configured, in the inflated state, to surround at least one seat of the vehicle interior.

12. The inflatable separating region according to claim 11, wherein at least one of the wall membranes comprises feedthroughs for elements of adjacent seat structures of the vehicle interior.

13. The inflatable separating region according to claim 1, comprising at least one fastening element for fixing a position of the separating region in the vehicle interior.

14. An aircraft comprising an inflatable separating region according to claim 1.

15. An inflatable separating region for a vehicle interior or a passenger cabin of an aircraft, comprising:
   a supporting structure comprising a plurality of interconnected inflatable tubes made of a flexible material and arranged, in an inflated state, to form a self-supporting frame structure for the separating region;
   a covering comprising a plurality of flexible wall membranes which connect the inflatable tubes to one another in a planar manner and are configured to separate off the separating region in the inflated state from the vehicle interior or passenger cabin of an aircraft; and
   a fastening element configured for fixing a position of the separating region in the vehicle interior;
   wherein the supporting structure comprises three of the plurality of tubes being arranged as vertically running tubes at three outer edges of the separating region, the three of the plurality of tubes being connected at an upper end at three corners of a rectangle formed by four of the plurality of tubes being arranged as transversely running tubes;
   wherein no vertically running tube is arranged at a fourth outer edge of the separating region such that the fourth outer edge comprises an exit or entry region; and
   wherein the fastening element is attached to the upper end of the supporting structure in a region substantially aligned with the fourth outer edge.

16. The inflatable separating region of claim 15, wherein the fourth outer edge comprises a reclosable passage opening to allow people to enter and leave the separating region.

17. The inflatable separating region of claim 16, wherein the passage opening is reclosable by a zip fastener.

18. The inflatable separating region of claim 15, comprising at least one fastening element for fixing a position of the separating region in the vehicle interior, wherein the at least one fastening element is provided at an upper end of the fourth outer edge.

* * * * *